June 15, 1954     E. C. KNIESTEADT     2,681,040
FOWL HOLDING CAGE DEVICE
Filed Dec. 28, 1951     2 Sheets-Sheet 1
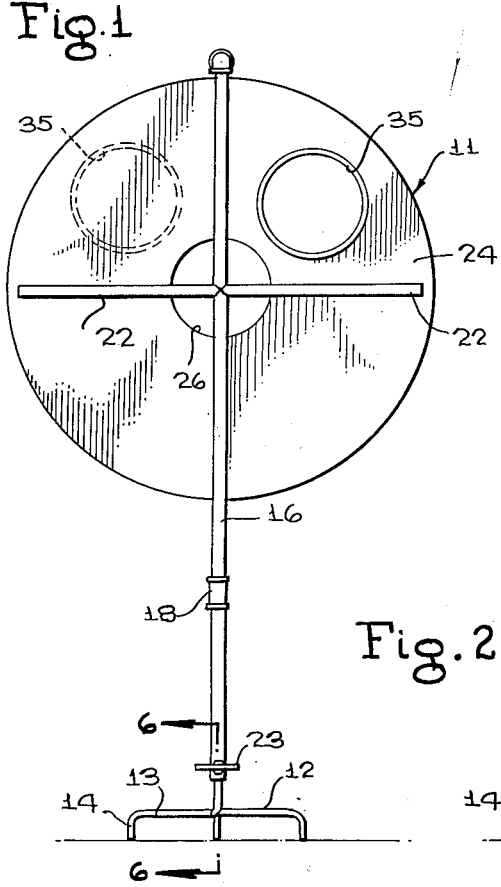
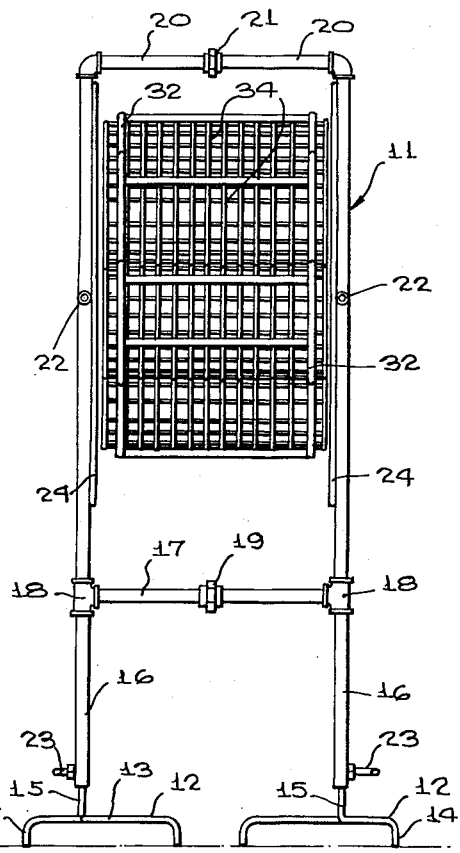
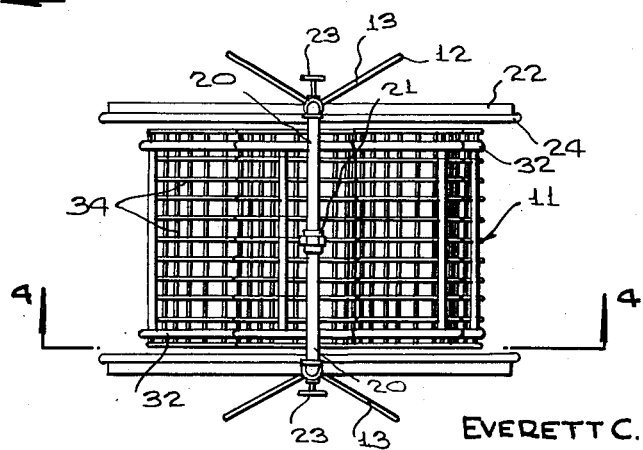
INVENTOR
EVERETT C. KNIESTEADT
BY
McMorrow, Berman & Davidson
ATTORNEYS June 15, 1954  E. C. KNIESTEADT  2,681,040
FOWL HOLDING CAGE DEVICE
Filed Dec. 28, 1951  2 Sheets-Sheet 2
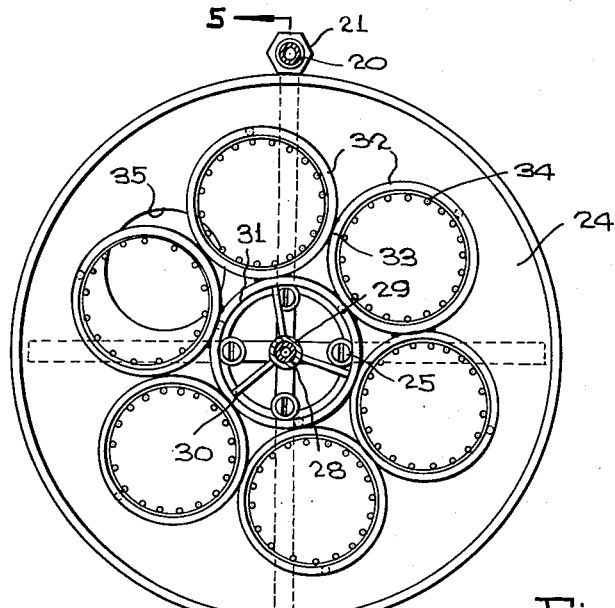
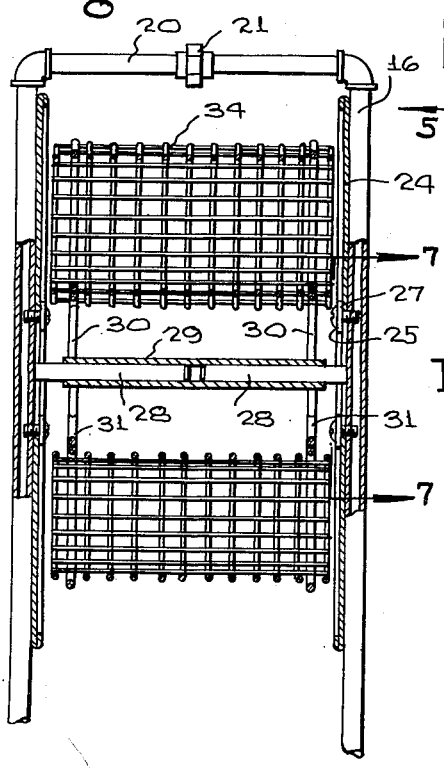
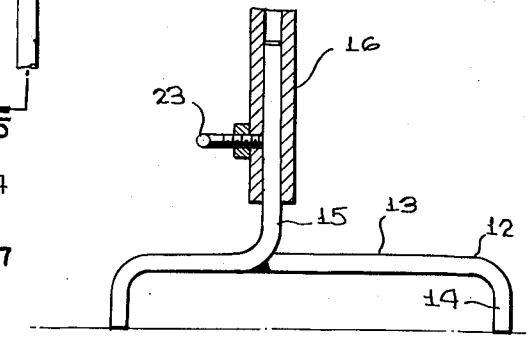
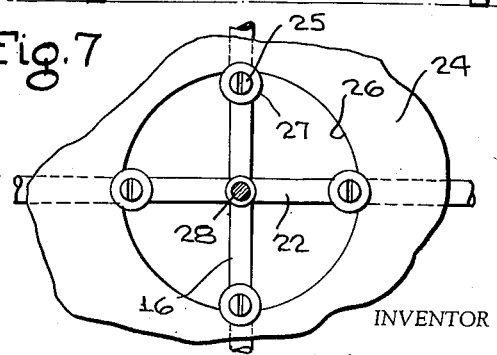
INVENTOR
EVERETT C. KNIESTEADT
BY
McMorrow, Berman & Davidson
ATTORNEYS Patented June 15, 1954

2,681,040

UNITED STATES PATENT OFFICE 2,681,040

FOWL HOLDING CAGE DEVICE

Everett C. Kniesteadt, Marysville, Kans.

Application December 28, 1951, Serial No. 263,829

4 Claims. (Cl. 119—97)

This invention relates to improved restraining devices for poultry, and more particularly to a restraining device which will facilitate the handling of fowls during blood testing of the fowls or similar operations.

A main object of the invention is to provide a novel and improved fowl restraining device which is simple in construction, which is easy to operate, and which is easy to clean.

A further object of the invention is to provide an improved fowl restraining device for use in holding hens and similar poultry during blood testing, vaccinating, or similar operations on the poultry, the improved device being inexpensive to manufacture, being sturdy in construction, being sanitary, and being easy to take apart.

A still further object of the invention is to provide an improved fowl restraining device which accommodates a number of fowls, which is arranged to securely hold the fowls without injury, and which is readily adjustable to a convenient height to suit the requirements of the user.

Further objects and advantages of the invention will become apparent from the following description and claims, and from the accompanying drawings, wherein:

Figure 1 is a side elevational view of an improved fowl restraining device constructed in accordance with the present invention.

Figure 2 is an end elevational view of the restraining device of Figure 1.

Figure 3 is a top view of the device of Figures 1 and 2.

Figure 4 is an enlarged vertical cross sectional view taken on the line 4—4 of Figure 3.

Figure 5 is an enlarged vertical cross sectional view taken on the line 5—5 of Figure 4.

Figure 6 is an enlarged cross sectional detail view taken on the line 6—6 of Figure 1.

Figure 7 is an enlarged detail view taken on the line 7—7 of Figure 5 and showing the connection of one of the side plates of the restraining device to the supporting structure thereof.

Referring to the drawings, the fowl restraining device is designated generally at 11 and comprises a pair of base members 12, 12, each base member consisting of a plurality of outwardly extending arms 13, formed at their ends with vertical ground engaging lugs 14, the arms being rigidly secured together and the supporting frames being provided with upstanding rod elements 15 at the junctions of said arms. Telescopically engaged on the upstanding rod elements 15 are the respective tubular sleeves 16, said sleeves being rigidly connected by short tubular sections 17, 17 connected to T fittings 18, as shown in Figure 2, the short sections 17, 17 being connected together by a union coupling 19. The top ends of the upstanding vertical sleeves 16 are connected by tubular sections 20, 20 which are joined together by a union coupling 21. Rigidly secured to the upper portions of the sleeves 16 are the respective horizontally extending tubular bar elements 22, extending at right angles to the vertical sleeve members 16 and being arranged in parallel planes. The sleeves 16 are locked in vertically adjusted positions on the upstanding rod elements 15 by set screws 23, 23 provided on the lower end portions of the respective sleeve elements 16, 16, as shown in Figure 2.

Designated at 24, 24 are respective annular plate members which are respectively secured to the horizontal bar portions 22, 22 and the vertical portions 16 of the sides of the supporting frame above described, the annular plate members 24 being arranged coaxially and with their common axis located at the intersections of the bar members 22 with the vertical sleeves 16. The annular plate members 24 may be secured to the vertical tubular sleeves 16 and the horizontal tubular arms 22 by bolts 25 threaded into the tubular members 16 and 22 inwardly adjacent the edge of the central apertures 26 of the plates 24, flat washers 27 being provided on the bolts 25 which overlap the inner portions of the annular plates 24 in the manner shown in Figures 5 and 7, whereby the annular plates 24 may be clamped to the tubular members 16 and 22 by tightening the bolts 25.

Rigidly secured to the junctions of the arms 22 and 16 are the aligned inwardly projecting horizontal bearing rods 28, 28, and rotatably mounted on the aligned bearing rods 28, 28 is a tubular sleeve 29. Secured to the end portions of the tubular sleeve 29 are the radial arms 30 to the ends of which are secured the respective ring members 31, 31 arranged coaxially with the sleeve 29. Secured to the periphery of each ring member 31 are the respective sets of rings 32, which are located around the peripheries of the ring members 30 and which are themselves rigidly connected together at their points of tangency, as shown at 33, as by welding or the like. The ring members 32 on the respective inner rings 31 are horizontally aligned, namely, the respective ring members 32 on one inner ring 31 are arranged on the same transverse horizontal axes as the respective ring members 32 on the other inner ring 31. Connecting the aligned pairs of rings 32 on the respective supporting inner rings 31, 31 are cylindrically formed cages 34 extending transversely between the annular plates 24, 24, the cages 34 being open at their ends and being blocked by the annular plate members 24. Each of the plate members 24 is formed with a circular aperture 35 which is registrable with an open end of one of the cages 34. As shown in Figure 1, the circular openings 35 are simultaneously registrable with the open ends of different cages 34. For example, the aperture 35 in one plate member 24 may be spaced on one side of the vertical plane defined by the upstanding supporting sleeves 16, 16 whereas the aperture 35 in the other plate 24 may be spaced similarly on the other side of said vertical plane.

In using the device, a fowl which may have been vaccinated or blood-tested is placed in one of the cages 34 through the aperture 35 in one plate 24, whereupon the cages are rotated by the weight of the fowl to bring another cage into registry with said first aperture, whereupon another fowl may be placed in the second cage, until a number of fowls which have been vaccinated or blood-tested have been placed in the device, each fowl being restrained in a cage 34. Eventually the fowls upon which the necessary operation has been performed and which were initially placed in the device are rotated to positions wherein their cages come into registry with the opening 35 in the opposite plate member 24, whereby the fowls may be successively removed from their restraining cages, allowing the empty restraining cages to be rotated successively to positions wherein they may be employed to receive new fowls which have received the vaccination, blood test or similar operations. As described above, the fowls are placed in their cages through the opening 35 in the first mentioned plate member 24.

In blood-testing or vaccinating a fowl, the fowl must be held quiescent for a period of from twenty seconds to two minutes after the operation.

It will thus be apparent that the fowls may be processed through the apparatus of the present invention in a continuous, rapid and efficient manner and with a minimum risk of harm to the fowls.

The height of the cages may be readily adjustable to suit the requirements of the user by means of the set screws 23, 23. When it is necessary to clean the device, the supporting frame may be disassembled by unfastening the union couplings 19 and 21, whereby the journal rods 28, 28 may be withdrawn from the bearing sleeve 29, allowing free access to the cages 34. The plate members 24, 24 may be readily detached from the supporting framework by unfastening the bolts 25.

While a specific embodiment of an improved fowl restraining device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fowl restraining device comprising a support, a pair of vertical parallel plate members rigidly secured to said support, rotary frame means journaled on a horizontal axis between said plate members, and a plurality of open-ended fowl restraining enclosures located at equal radial distances on said frame means around the rotational axis of said frame means, the open ends of the enclosures being located adjacent the respective plate members, each plate member being formed with an opening registrable with an open end of one of the enclosures.

2. A fowl restraining device comprising a support, a pair of vertical parallel plate members rigidly secured to said support, rotary frame means journaled on a horizontal axis between said plate members, and a plurality of open-ended fowl restraining enclosures secured on said frame means at equal radial distances around the rotational axis of said frame means, the open ends of the enclosures being located adjacent the respective plate members, each plate member being formed with an opening registrable with an open end of a different one of the enclosures.

3. A fowl restraining device comprising a vertically adjustable upstanding support, a pair of vertical parallel plate members rigidly secured to the respective sides of said support, aligned, inwardly projecting horizontal bearing rods secured to the respective sides of the support, rotary frame means journaled on said bearing rods between said plate members, and a plurality of open-ended cylindrical fowl restraining enclosures located at equal radial distances around the rotational axis of said frame means and secured on said frame means, the open ends of the enclosures being located adjacent the respective plate members, each plate member being formed with a circular opening registrable with an open end of a different one of the enclosures.

4. A fowl restraining device comprising a vertically adjustable upstanding support, a pair of vertical parallel annular plate members rigidly and coaxially secured to the respective sides of said support, aligned, inwardly projecting horizontal bearing rods secured to the respective sides of the support along the axis of said annular plate members, and a rotary frame journaled on said bearing rods between said plate members, said frame including a plurality of open-ended cylindrical fowl restraining cages located at equal radial distances around the rotational axis of the frame, the open ends of the cages being located adjacent the respective plate members, each plate member being formed with a circular opening registrable with an open end of a different one of the cages.

References Cited in the file of this patent

UNITED STATES PATENTS

| Number | Name | Date |
|---|---|---|
| D. 163,831 | Shoffner | July 3, 1951 |
| 916,795 | Shafer | Mar. 30, 1909 |
| 1,700,218 | Eisenstat | Jan. 29, 1929 |
| 2,319,938 | Markins | May 25, 1943 |
| 2,574,765 | Smith | Nov. 13, 1951 |